Sept. 14, 1937.                A. D. MacLEAN                 2,093,151
                        PRESSURE COMPENSATING GAS METER
                  Original Filed Aug. 3, 1931      4 Sheets-Sheet 3
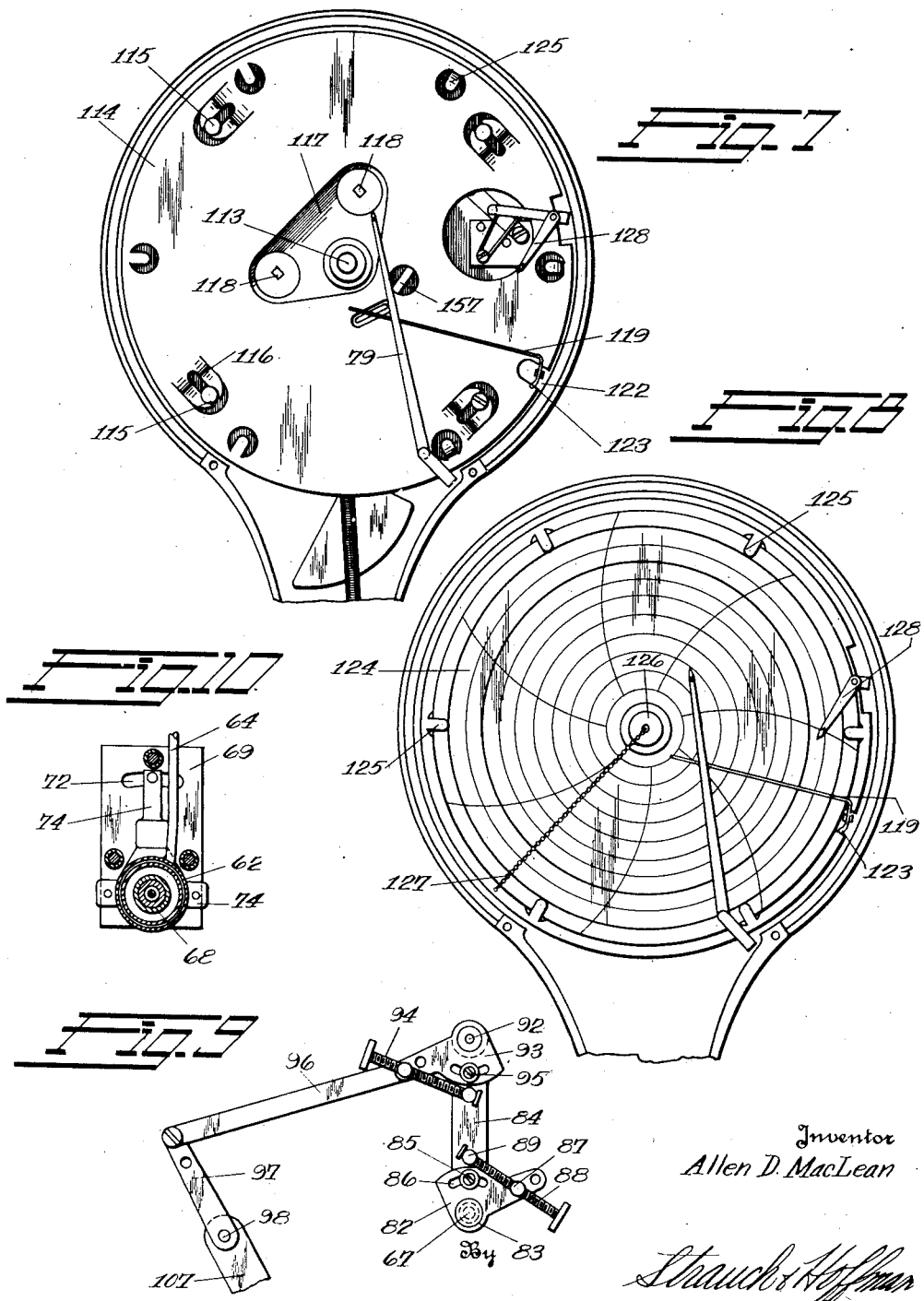
Inventor
Allen D. MacLean Sept. 14, 1937.  A. D. MacLEAN  2,093,151
PRESSURE COMPENSATING GAS METER
Original Filed Aug. 3, 1931  4 Sheets-Sheet 4
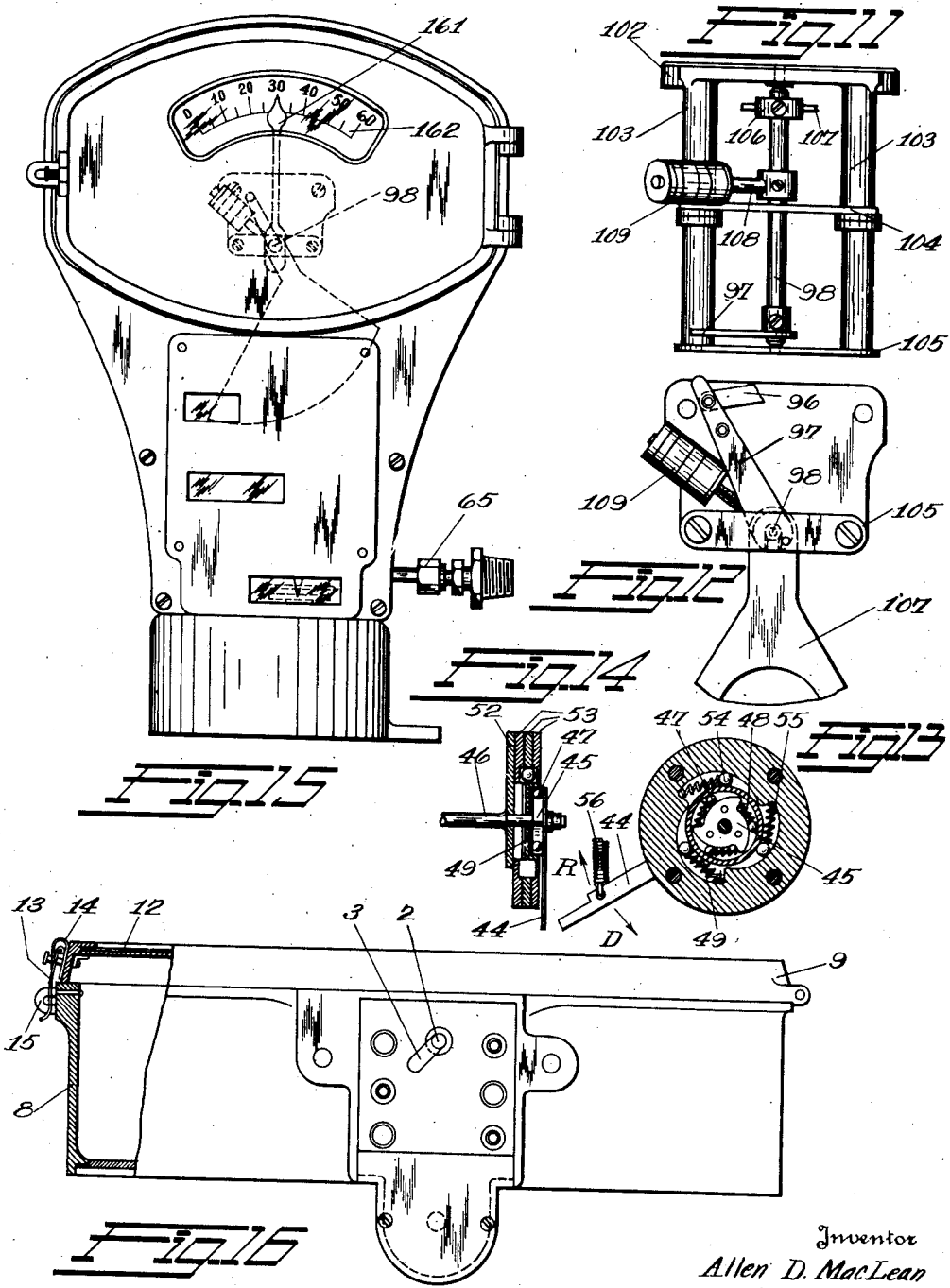
Inventor
Allen D. MacLean
By
Strauch & Hoffman
Attorneys Patented Sept. 14, 1937

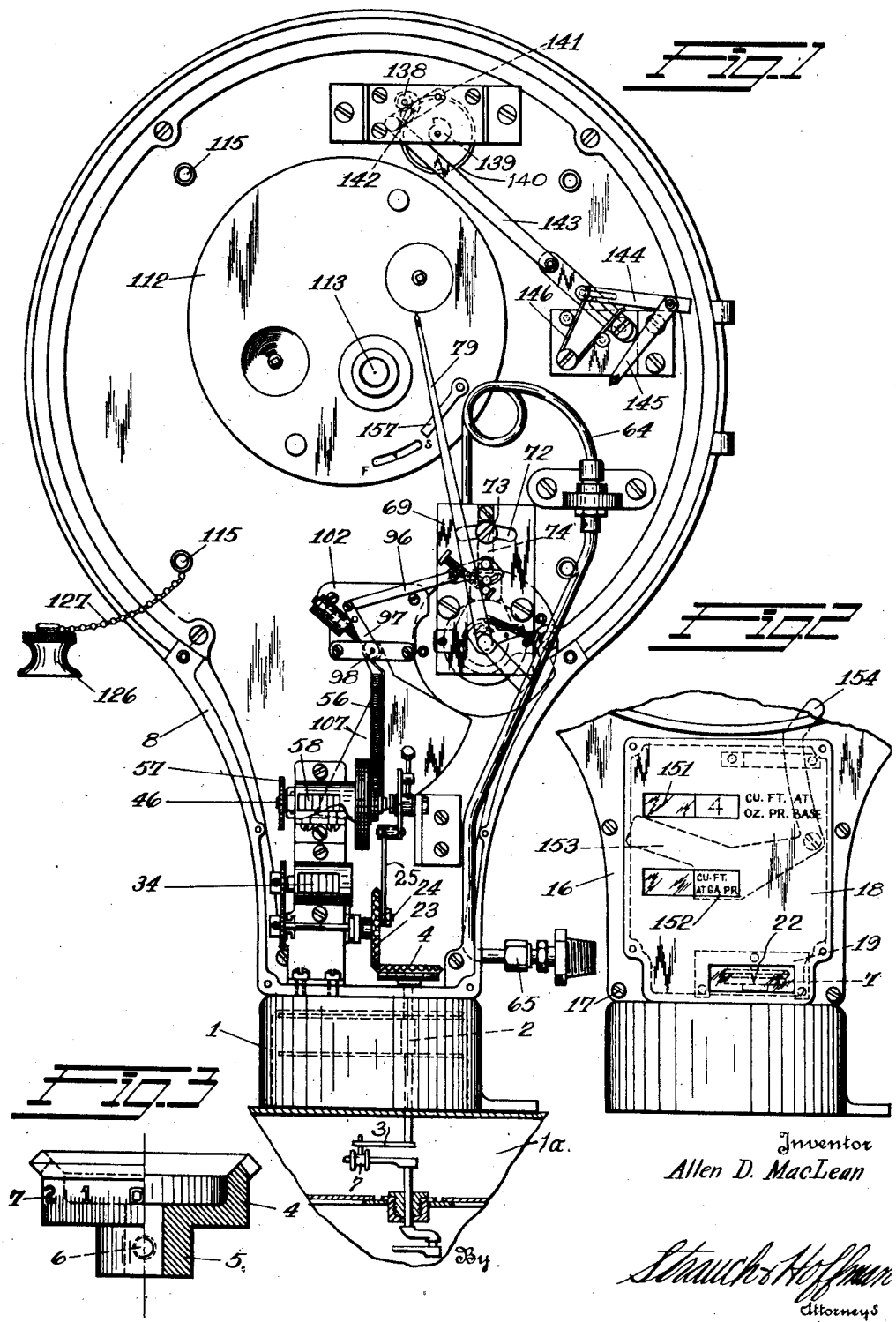

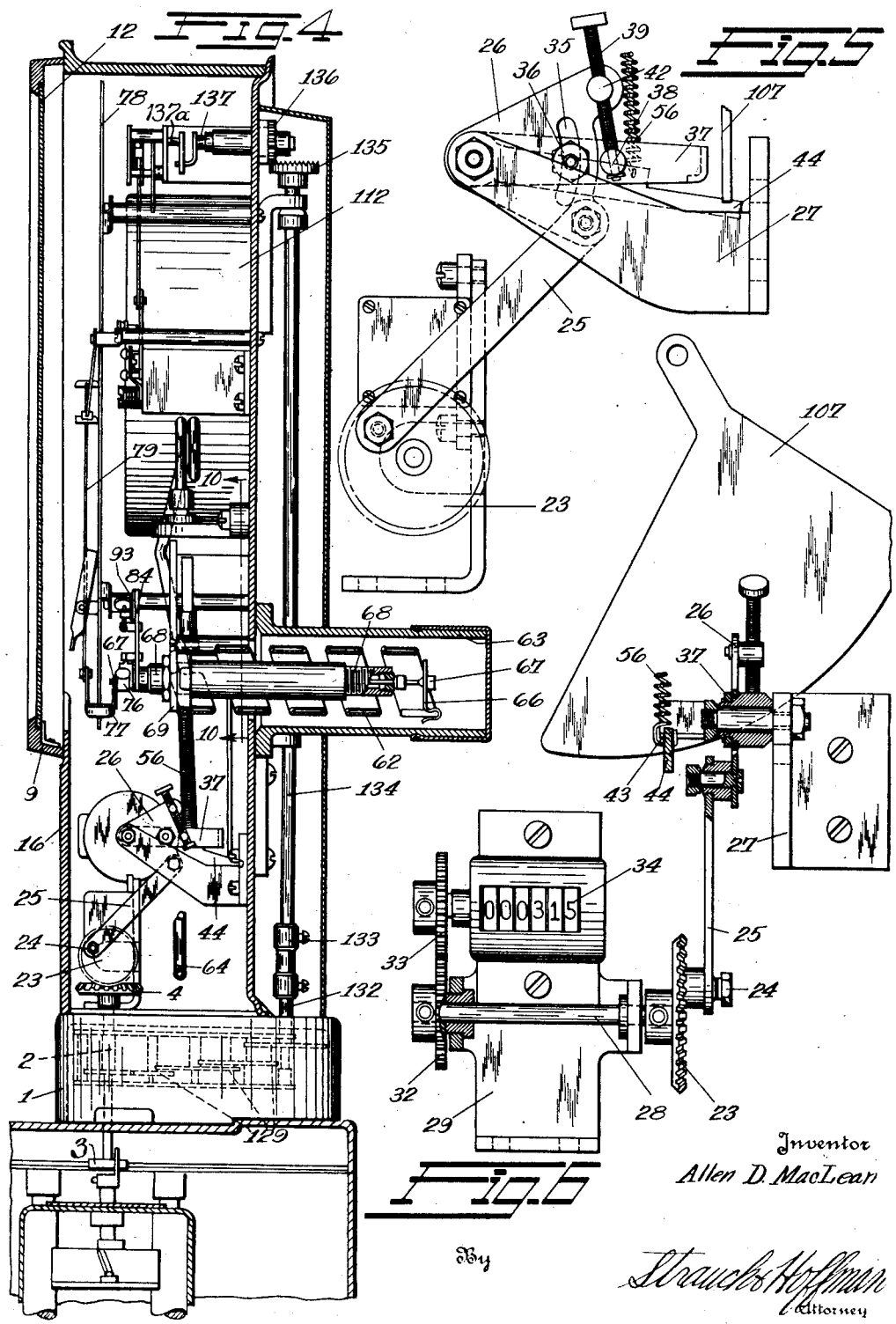

2,093,151

UNITED STATES PATENT OFFICE 2,093,151

PRESSURE COMPENSATING GAS METER

Allen D. MacLean, Pittsburgh, Pa., assignor to Pittsburgh Equitable Meter Company, Pittsburgh, Pa., a corporation of Pennsylvania Application August 3, 1931, Serial No. 554,879
Renewed November 30, 1935

8 Claims. (Cl. 73—233)

This invention relates to an improved metering mechanism for directly and accurately registering the total volume of gas passing through the meter as reduced to a base pressure in spite of variations in pressure of the gas during the metered period.

As is well known, the usual type of gas meter registers the volume of gas passing therethrough without taking into account or compensating for the fact that a much greater quantity of gas by weight passes through the meter when the pressure on the line increases. When gas is sold to large consumers, such as an industrial plant, the contract between the gas company and user usually designates the price per unit volume of gas at a predetermined base pressure, such for example as four-ounce base pressure. Since the gas is a compressible medium the quantity passing through a meter is dependent not only upon the volume but also upon the pressure in accordance with Boyle's law. In most installations it is impractical for the gas companies to maintain a definite pressure at all times, and frequently it is not feasible to maintain a pressure as low as the base pressure on the main, since the fluctuating demands of the consumers require much higher pressures at peak loads. Frequently the gas companies maintain variable pressures on their line under such conditions and obviously the total quantity of gas by weight or the B. t. u. content thereof is much greater at these high pressures than at the lower pressures, so that the ordinary meter gives no correct indication of the total quantity of gas that has passed therethrough.

In order to insure a correct charge to the consumer for the actual amount of gas used, various expedients have heretofore been resorted to by the gas companies. In some installations Pitot tubes have been used or an orifice meter has been connected in the gas conduit and combined with registering charts upon which is recorded the differential and static pressures for a given period of time. The actual volume of gas as reduced to a definite base pressure then is calculated according to the known constant for the orifice or Pitot tube meter. In other installations the usual displacement type of gas meter has been provided with a chart driven either by clockwork or by movement of the meter itself, this chart being connected with a static pressure gauge such that the static pressure of the gas is registered at all times on the chart. Thus the volume of gas is registered by the usual gas meter and the pressure thereof may be read from the pressure chart, and a series of calculations may be made for certain intervals of time, for example for each half hour or by volume increments to thus secure an approximately correct volume of gas at a predetermined base pressure. Obviously either of the above methods are laborious and time consuming and are subject to human error in calculating the correct volume of gas.

It is an object of this invention therefore to provide a measuring system and apparatus for use with gas mains whereby the corrected volume of gas as reduced to a predetermined base pressure may be indicated directly and without further computation.

A meter of this general type is described in a copending application of Allen D. MacLean and Fritz Niesemann, Serial No. 462,843, filed June 21, 1930. The present invention relates to the type of meter disclosed in the said copending application, the present invention being directed to improvements in the construction and operation thereof.

Another object of this invention is to provide a compensating gas meter of the type disclosed in said copending application and embodying an improved adjustment for the parts whereby the mechanism may be accurately and simply calibrated for correct registration. As is well known, it is necessary that the volume meters used for measuring the flow of gas meters be periodically checked as to their accuracy. This checking of the meters is done in various ways, one method being to connect a standard and accurately calibrated volume meter in series with the meter to be tested and then run a quantity of gas through both meters and compare the readings thereof. Another method is to connect the meters to be checked to a bell type prover, displacing a known volume of gas and allowing this known volume to pass through the meter and checking the reading of the meter. Another method uses a low pressure orifice type prover, wherein an orifice having a known discharge rate at any controlled pressure is used to govern the rate of flow through the meter, and the revolution rate of the meter is timed. The rate of flow as timed is compared to the rate at which the orifice type prover limits the flow, and the meter accuracy thus determined.

Another object of this invention therefore is to provide a compensated direct reading gas meter adapted to be detachably associated with the usual volume gas meter, said direct reading meter having means associated therewith to facilitate the checking of the volume gas meter. More specifically, this object is accomplished by the provision of a calibrating or proving dial directly driven by the gas meter, said dial being interconnected directly with a volume index. This volume index is adapted to register the volume of gas passed through the meter without reduction to the base pressure. The graduations on the dial are arranged to cooperate with a pointer, which is visible from the exterior of the meter without disassociating any of the parts. By this construction the direct reading meter may be permanently associated with a volume gas meter of the usual type and checking for accuracy of both the volume gas meter and the direct reading meter may be accomplished without disassociating the parts in the usual manner, such as by way of a standard calibrated volume gas meter. The graduations on the dial are divided into small sub-divisions whereby the accuracy of the volume gas meter may be read within close limits and proper adjustments made in the gas meter to compensate for any inaccuracy noted on the dial and the index associated therewith.

The use of the above described proving device directly incorporated into the direct reading meter constitutes an important feature of this invention. The checking of both the usual type of volume gas meter and the compensating meter is greatly facilitated since the mechanism need not be removed from its position but the standard meter need only be connected in series therewith and the checking may be readily accomplished.

Another object of this invention is to provide a compensating gas meter embodying mechanism wherein the volume flow of gas is automatically reduced to a base pressure and wherein a pointer cooperates with a scale to directly indicate the actual pressure of gas passing through the metering mechanism.

Another object of this invention is to provide a compensating gas meter having a volume index whereon is recorded the volume of gas as reduced to a predetermined base pressure, and having also an uncompensated index whereon is indicated the actual volume of gas, with an improved casing whereby the volume index is visible at all times, and the uncorrected volume index is accessible only to authorized attendants by opening the casing.

A further object of the invention is to provide a compensating gas meter which is rugged and not subject to easy derangement of the parts and embodying simple and readily accessible calibrating and adjusting mechanisms.

These and various other objects of this invention will be apparent from the following description and the appended claims when taken in connection with the accompanying drawings wherein:

Figure 1 is an elevation of the compensating meter with the chart and the front of the casing removed mounted on a gas meter of the type hereinbefore mentioned.

Figure 2 is a broken elevation of the lower part of the casing.

Figure 3 is a part sectional and part elevational view of the combined proving dial and driving gear.

Figure 4 is a central sectional view taken at right angles to Figure 1, the lower gear casing being shown in elevation.

Figure 5 is an enlarged detail showing the driving connection from the uncompensated index to the compensated index.

Figure 6 is an enlarged detail partly in section taken from the left of Figure 5.

Figure 7 is a broken elevation of the casing with the chart and the supporting plate therefor removed.

Figure 8 is a broken front elevation of the casing with the chart in position.

Figure 9 is a detail showing the adjustable connection between the pressure element and the cam operable thereby.

Figure 10 is a detail taken on line 10—10 of Figure 4 showing the adjustable mounting for the Bourdon tube.

Figure 11 is a detail showing in plan the support for the cam shaft.

Figure 12 is a front elevation thereof.

Figure 13 is a vertical section through the one-way ratchet operating mechanism for driving the compensated index.

Figure 14 is a vertical section taken at right angles to Figure 13.

Figure 15 shows in elevation a slightly modified form wherein the pressure of the gas is indicated by a hand cooperating with a scale.

Figure 16 is a slightly enlarged view showing the bottom of the compensating meter, parts being broken away.

Referring to Figures 1 and 4, there is provided a base portion 1, adapted to be detachably connected to a volume gas meter such as the displacement meter shown in the application of A. D. MacLean and H. G. Weymouth, Serial No. 288,230, filed June 25, 1928, or any other form of gas meter 1a, whether rotary or displacement. A shaft 2 extends through the upper portion of the base 1 and has an arm 3 on the lower end thereof for engagement with rotatably driven portion 7 of the meter 1a. Shaft 2 has secured on its upper end a miter gear 4 shown in enlarged section in Figure 3. As seen in Figure 3, miter gear 4 is provided with a depending collar 5 having a threaded opening 6 for the reception of a set screw to secure the same in position on the shaft 2. The annular face of the gear 4 just beneath the teeth is provided with a series of indicia preferably numbered 0, 1, 2, —9. These divisions on the gear 4 are furthermore divided into small sub-divisions preferably into ten sub-divisions each. The miter gear 4 functions as a proving dial or proving index, whereby the accuracy of the meter may be easily checked, as described hereinafter more in detail.

As seen in Figure 1, the miter gear 4 is positioned within and adjacent the lower end of a casing 8. Casing 8 is adapted to be closed at its front by two covers, the upper circular portion thereof being closed by a swinging cover 9 (see Figure 16) having a glass front 12 and adapted to be secured in closed position by a hasp 13, normally spring pressed towards the closed position by a band spring 14 and cooperating with a catch 15 adapted to receive a lock. The lower end of casing 8 is adapted to be closed by a cover 16 secured in position by screws 17, (see Figure 2), the cover 16 having secured thereto a plate 18 carrying suitable lettering designating the type of meter and pressure of gas to which it is adapted to reduce the volume reading. Cover 16 is also provided with a sight opening positioned adjacent the miter gear 4 and closed by a glass front secured in position by a small plate 19 on the inner face of cover 16. The plate 19 carries a pointer 22 projecting downwardly and cooperating with the indicia 7. The miter gear 4 meshes with a horizontally supported miter gear 23 having a crank pin 24 thereon, with which is engaged a crank arm 25. As seen in enlarged detail in Figures 5 and 6, the crank arm 25 is pivotally connected at its upper end to two-armed bracket or segment 26 pivotally secured to a stationary supporting bracket 27.

The driven miter gear 23 is fixedly secured to a shaft 28 mounted in a stationary bracket 29, and to the opposite end of shaft 28 is a gear 32, meshing with a gear 33 of an index or counter 34. It will be seen that the counter 34 is directly driven by the flow of gas through the meter and will therefore register directly the volume of gas passing through the meter without any compensation for variations of pressure.

As seen in Figure 5, the pivoted bracket 26 is provided with a slot 35 adapted to receive a bolt 36 mounted on an arm 37. Arm 37 is provided with an upstanding bearing block 38 in which is journaled a threaded adjusting bolt 39. Bolt 39 is threaded through an upstanding bearing 42 of the bracket member 26. From the above described construction it will be obvious that the arm 37 and bracket 26 may be accurately adjusted to various angular positions by loosening the nut on the set screw 36 and turning the adjusting bolt 39. These arms may therefore be moved closer together or spread apart for the purposes of adjustment as hereinafter more fully described.

The arm 37 has a portion 43 which projects above a lever arm 44. Lever 44 is rigidly connected to the movable driving portion of a one-way clutch or ratchet mechanism for driving a compensated counter or index. As seen in Figures 13 and 14, lever 44 is secured to a cam member 45 which is loosely swiveled on the index or counter shaft 46. Cam member 45 is provided with a plurality of outwardly sloping cam faces as seen in Figure 13, which cooperate with balls 47, normally pressed toward the upper portion of the cams by springs 48. Surrounding the cam member 45 is an intermediate cup shaped member 49 adapted to be engaged by the balls 47. The intermediate cup member 49 is secured to the index driving shaft 46, for simultaneous rotation therewith. It will be seen that from an inspection of Figures 13 and 14, that oscillation of lever 44 in the direction of the arrow D causes the cam member 45 to cam the balls 47 outwardly into binding engagement with the intermediate member 49 whereby member 49 is caused to move with lever 44, thus driving shaft 46.

In order to prevent any possible back slip of the intermediate member 49 and the counter or index shaft 46, an additional one-way clutch member is mounted to surround the intermediate member 49. This back-slip preventing mechanism includes a plate 52 secured to a bracket mounted on the casing 8. Secured to plate 52 are a plurality of plates 53, the inner plates 53 having cam recesses therein as seen in Figure 13 in which are positioned locking balls 54 engaged by springs 55. It will be seen that the mechanism just described will allow movement of the intermediate cup member 49 when lever 44 is moved in the direction of the arrow D, Figure 13. However, when lever 44 moves upwardly in the direction of the arrow R, the balls 54 are cammed into engagement with the cup member 49, and prevent back slip of the index or counter shaft 46.

By the novel clutch or ratchet construction as above described, the counter or index shaft 46 will be accurately driven in one direction of rotation, but is prevented from movement in the opposite direction. Due to the plurality of balls contained in the raceway, an accurate drive is provided. The springs 48 maintain the balls 47 in driving position at all times and when lever 44 moves downwardly, Figure 13, there is absolutely no lost motion between the parts and the index shaft 46 is driven very accurately. During contrary rotation of lever 44 there can be no back slip of the index shaft due to the locking balls 54. Although the clutch mechanism above described has been shown and described as having balls contained therein, it will be understood that other members having circular faces may be used, such as rollers or the like. In the appended claims it will be understood that the term "balls" is specifically intended to include rollers or similar circular members.

The arm 44 is connected to an upwardly extending coil spring 56 secured at its upper end to a bracket mounted on the casing 8. The counter or index shaft 46 is connected by cooperating gears 57 Figure 1, to a compensated counter or index 58.

The operation of the mechanism as thus far described is as follows. During flow of gas through the meter, the shaft 2 is driven to rotate the miter gears 4 and 23. Rotation of gear 23 directly drives the indicator or counter 34 to indicate directly the volume of gas passing through the meter. Rotation of miter gear 23 causes the crank arm 25 to be oscillated, thus oscillating the bracket 26 and the rigidly connected arm 37 about their pivotal axis. The spring 56 normally pulls the arm 44 upwardly into engagement with the projecting portion 43 of arm 37. During downward motion of bracket 26 and lever arm 37, the lever arm 44 is moved downwardly as seen in Figure 13, and the index or counter shaft 46 is driven therewith to operate the counter 58. When bracket 26 and arm 37 rise during the second portion of their oscillating movement the spring 56 maintains the arm 44 in engagement with lever 37 and the arm 44 therefore rises. However, the counter 58 is not operated during this portion of the cycle of movement.

The operative throw of the pivoted actuating arm 44 is automatically governed in accordance with the static pressure of gas in the meter to thereby provide an automatic means for compensating for varying pressures of the gas. This construction is as follows: A Bourdon tube 62 or other similar pressure responsive element is mounted in the casing 8 and in the embodiment shown, the Bourdon tube 62 projects rearwardly through an opening in the back of the casing and is housed by an auxiliary detachable casing 63. The inner end of the Bourdon tube 62 is connected to a pressure pipe 64 which projects out of the casing 8 and is adapted to be connected by union couplings 65 to the gas conduit. The rearward end of the Bourdon tube 62 is connected by a strap 66 to a shaft 67 suitably supported for rotation in a sleeve 68.

Sleeve 68 projects forwardly through a bracket 69 rigidly mounted on the casing 8. As seen in Figures 1 and 10, bracket 69 has a slot 72 in the upper end thereof in which is received a set screw 73 secured at its lower end to a movable bracket 74. This bracket 74 is supported for rotation about the sleeve 68 secured to stationary bracket 69. The inner end of the Bourdon tube 62 is supported by the movable bracket 74.

The shaft 67 is actuated by the movement of the Bourdon tube, and the inner end thereof projects beyond the inner end of sleeve 68 and has a collar 76 (Figure 4) secured thereto. To collar 76 is secured a U-shaped strap 77 which projects around the edge of the chart-supporting plate 78 and carries the recording pen 79. Thus it will be seen that oscillations of shaft 67 due to the variations in pressure of the gas will be transmitted by way of shaft 67, collar 76 and strap 77 to the recording pen 79.

Also mounted on the inner end of shaft 67 is a bracket or segment 82, (Figure 9) having a collar 83 secured to the shaft 67 by a set screw. Loosely swiveled about the axis of shaft 67 is a substantially vertical strap 84 carrying a set screw 85 projecting through a slot 86 in the bracket 82. One arm of bracket 82 has an upstanding lug 87 in which is threaded an adjusting bolt 88, the opposite end of which is swiveled to strap 84 by way of an upstanding lug 89. It will be seen that the angular relation between the strap 84 and bracket 82 may be adjusted by loosening the set screw 85 and turning the adjusting bolt 88.

The upper end of strap 84 has a forwardly projecting stub shaft 92 about which is swiveled another bracket member 93 similar in construction to bracket 82. Bracket 93 is adjustable with relation to strap 84 by means of an adjusting bolt 94, similar to bolt 88 and threaded through a lug on the bracket 93 and swiveled to strap 84. A set screw 95 is adapted to secure these parts in their adjusted position.

A link 96 is pivotally connected to bracket 93 at one end and at the opposite end is pivoted to upstanding arm 97 secured to a forwardly extending horizontal shaft 98. As seen from Figures 11 and 12 the arm 97 has two openings whereby the link 96 may be secured to arm 97 in either of two positions. The shaft 98 is pivotally mounted in a base member 102 secured to the back of the casing 8. Base 102 carries two forwardly extending posts 103 connected by an intermediate strap 104 and an outer strap 105. The shaft 98 is journaled in the two straps 104 and 105 and base 102. The arm 97 is secured to shaft 98 by a set screw as seen in Figure 11 whereby the angularity of these parts may be adjusted.

Secured to the shaft 98 adjacent the base 102 by way of a set screw passing through a collar 106 is a cam member 107. In order to balance the weight of the cam 107, the shaft 98 has secured thereto by a set screw an arm 108 to which is threaded the adjustable weights 109. By removing or adding weights and adjusting the same along the arm 108 as well as adjusting the arm with relation to the shaft 98, the weight of the cam 107 may be counterbalanced precisely.

As previously explained, this invention embodies a compensating gas meter in which the volume of gas passing therethrough is automatically reduced to a predetermined base pressure, the meter automatically compensating for variations in static pressure of the gas. Frequently the gas company wishes to reduce the pressure to a standard four ounces. However other base pressures may be desirable, and various cams may be positioned on the shaft 98 to reduce the pressure to different base pressures. For example it may be desirable to reduce to eight ounces base pressure or twelve ounces. If such is desirable, the proper eight ounce or twelve ounce cam will be substituted on the shaft 98.

The cam 107 has its lower edge cut substantially as shown in Figure 6 and this edge is positioned in the path of movement of the spring biased arm 44. It will be seen that the lower edge of the cam 107 limits the upward movement of arm 44. The oscillations of the driven lever arm 37 moves the driving lever arm 44 downwardly against tension of its spring 56, the cam 107 limiting upward movement of this arm, in accordance with the varying static pressures of the gas.

In order to provide a check for the compensated index reading and to make a permanent record of the pressures maintained, these pressures are recorded upon a time-driven chart 124. A clockwork 112 is mounted in casing 8 and is adapted to drive a shaft 113 to which the chart is secured. Figure 1 shows the casing 8 with the chart removed and the casing open. As seen in Figure 7, the circular face of the casing is adapted to be closed by a detachable plate 114 secured to the outer ends of posts 115 by the integral clips 116 which engage over the ends of the posts when the plate 114 is moved counterclockwise. Plate 114 has a central opening 117 whereby when the chart 124 is removed the winding shafts 118 are accessible for winding the clock. As seen from Figures 7 and 8 the registering hand 79 projects over this plate 114, being normally biased towards the plate by its spring action.

In order to facilitate the positioning of the charts, plate 114 is provided with an outwardly extending arm 119 which projects under the recording hand 79 and is pivoted to the plate at 122 and has a finger piece 123. By depressing the finger piece 123, the recording hand 79 is lifted from engagement with a chart so that a new chart may be substituted. The chart 124 is maintained flat by slipping the same under the upwardly extending lugs 125 which are cut out of the plates 114. The chart 124 is secured to the drive shaft 113 of the clockwork by a detachable cap 126 secured by chain 127 to one of the posts 115. This cap 126 is threadedly engaged with the shaft 113 whereby the chart is clamped between the cap and a shoulder on shaft 113 whereby the chart is driven by the clockwork. Although this invention has been shown and described in connection with a clock driven chart, it will be understood that a meter driven chart may be used as shown in Figures 1 and 2 of copending application #462,843.

This invention also embodies means whereby a record is made on the chart of the rate at which gas is used by the consumer. For this purpose the chart 124 is provided near its perimeter with base lines, one line indicating 1000 cubic feet of gas, the other line indicating 10,000 cubic feet. A recording hand 128 is adapted to oscillate in accordance to the volume flow of gas, each complete oscillation representing either 1000 cubic feet or 10,000 cubic feet in accordance with which base line the recorder is associated. This mechanism for recording on the edge of the chart is described and claimed in a copending application of J. R. Armstrong and L. H. Duncan Serial No. 78,545, filed December 31, 1925, now Patent Number 1,816,995 and also is described in copending application #462,843. Briefly this mechanism operates as follows.

Referring to Figure 4, the shaft 2 is connected by a train of gearing 129 to drive a vertical shaft 132 connected by collars 133 to a shaft 134 extending up the back of and exterior to the casing 8. The upper end of shaft 134 has a crown gear 135 meshing with a gear 136 on shaft 137 which is connected to drive two cams 138, 139. Shaft 137 drives shaft 137a by means of the crank and arm connection illustrated in Figure 4. Shaft 137a is provided with a pinion meshing with a gear 140 on a short shaft carrying cam 139. Cam 139 is driven with gear 140 by means of the pinion on the shaft carrying cam 138. Cam 138 is adapted to make one complete revolution for each 1000 cubic feet of gas, and cam 139 makes one complete revolution for each 10,000 cubic feet of gas. Positioned between cams 138 and 139 is pivoted lever 141 having a pin 142 adapted to be oscillated by either of said cams. Lever 141 is connected by strap 143 to a U-strap 144 which projects over the edge of the chart and carries a recording pen 145. A hairpin spring 146 is adapted to bias the strap 143 and pin 142 into engagement with one of cams 138 or 139 depending upon the position of the hairpin spring 146 as described in the patent referred to. With the parts shown in Figure 1, the pin 142 is held in cooperation with cam 138 and each time the cam makes one revolution the strap 143 is moved downwardly and upwardly due to spring 146. This movement of the shaft 143 is communicated to the recording hand 145 to make an oscillating curve on the edge of the chart to thus record the volume of gas during a definite period of time in accordance with the timed movement of the chart. For large users of gas, the hairpin spring 146 is reversed and the mechanism cooperates with cam 139 to record each 10,000 cubic feet of gas.

In order that the corrected or compensated dial 58 may be visible at all times, the closure plate 16 is provided with an opening 151. Adjacent the uncompensated index 34 closure plate 16 is provided with another opening 152 normally closed by a strap 153 pivotally secured to the cover. Strap 153 may be moved to the position shown in Figure 2 when the dial face of the casing 8 is open and the handle member 154 moved as shown. Normally however the strap 153 is interposed in front of the index 34, rendering this index invisible. When it is necessary to check the instrument or for any other reason it is desirable to have the properly authorized attendant read the uncompensated dials 34, the casing 8 is opened and the handle 154 moved to the position shown in Figure 2. When the handle is thus moved, the designation "Cu. ft. at gauge press." is positioned adjacent index 34.

From the description of the apparatus as above given it will be obvious that the arm 44 is limited in its oscillations in accordance with varying pressures of the gas. As the pressure varies the cam 107 takes up a varying position depending on the static pressure of the gas. When the pressure is low or near the base pressure the cam takes up a position toward the right of Figure 6. As the pressure rises the cam moves clockwise to allow a greater path of movement to arm 44.

The operation of the mechanism is as follows: When the base 1 is mounted on a displacement gas meter and the union connection 65 connected with the gas in the conduit, the meter is connected in position for service. The clockwork 112 is wound by way of the usual key. The clockwork is provided with a starting lever 157 which as seen in Figure 7 may be oscillated through an opening in the plate 114 whereby the clock mechanism may be started in operation. A chart 124 is then secured in position over the shaft 113 by the cap 126. Since the static pressure of gas is applied to the Bourdon tube 62 the movable shaft 67 carrying pressure recording arm 79 will be rotated and will assume a position in accordance with this pressure to record the pressure on chart 124. Movement of bracket 82 secured to shaft 67 causes oscillation of the strap 84 and bracket 93, and corresponding movement is transmitted to the cam 107 by the link 96 which therefore takes up a position in accordance with the static pressure of the gas.

As the volume gas meter moves in accordance with the flow of gas, the shaft 2 is rotated, thereby rotating the miter gears 4 and 23. As gear 23 rotates the index counter 34 is caused to register the volume of gas passing through the meter. Furthermore the crank pin 24 causes reciprocation of the connecting strap 25 to thus oscillate the yoke bracket 26, and the connected arm 37. Downward movement of the arm 37 carries with it the actuating lever 44 which is connected to the one way clutch mechanism whereby the intermediate cup shaped member 49 is moved counterclockwise as viewed in Figure 13. This motion causes driving movement of the compensated index shaft 46 to register on the index 58.

As the bracket 26 and arm 37 pass the lowest point of their movement and start upwardly, the driving arm 44 follows the lever 37 due to the tension of spring 56. However, reverse movement in the direction of the arrow R causes disengagement of the ball clutch mechanism at once, and reverse movement of index shaft 46 is prevented by simultaneous engagement of the outer ball members 54 with the intermediate member 49. The lever 44 thus follows the upward movement of driving arm 37 until lever 44 engages the lower edge of cam 107, which as previously stated is positioned in accordance with static pressure of gas. The yoke shaped bracket 26 and connected arm 37 continue upward movement and then return downwardly to again pick up the arm 44 and carry it downwardly to complete its cycle of movement.

This cycle continues as long as the gas is passing through the meter. Thus the effective throw of the actuating lever 44 is governed in accordance with the static pressure of the gas. The shape of the cam 107 is such that the angular movement of the lever 44 is proportional to the gas volume at a given pressure. Assuming that a cam associated with the meter is adapted to reduce the pressure to a base of four ounces and the static pressure in the conduit is four ounces, both the indexes 34 and 58 should be driven at the same rate. The cam 107 will then limit the operative throw of lever 44 to about 18°. The operative throws of lever 44 for the other varying pressures may be easily calculated according to Boyle's law, and the lower edge of cam 107 shaped accordingly. Since all movement of the compensated counter or index 58 is governed by the operative throw of lever 44, which in turn is governed by the static pressure of the gas, the index 58 will record in cubic feet the volume of gas as reduced to a predetermined base pressure irrespective of the actual pressure of gas in the conduit. Other cams may be substituted whereby the volume may be reduced to any desired base pressure, the lower edge of each cam being constructed according to the base pressure desired.

The blanking strap 153 shown in Figure 2, normally covers the uncompensated index 34. When an authorized attendant opens the cover 9, the handle 154 of the strap may be oscillated to the position shown in Figure 2 whereby the uncompensated index 34 is visible, the designation "Cu. ft. at gauge press.", being also visible through the sight opening 152.

During the operation of the volume gas meter the vertical shaft 134 is driven to rotate the cams 138, 139 in accordance with the rate of flow of the gas, one of these cams causing oscillation of the pin 142 and the strap 143 and the recording hand 145 to record on the edge of the chart the volume of gas per unit of time. These oscillations may be counted to compute the rate of flow. For example, if the oscillations are from the 1000 cubic foot base line and 10 such oscillations occur in a 24-hour period, it will be clear that the user is consuming gas at the rate of 10,000 cubic feet per day. Furthermore, the peak period of demand is easily ascertainable by an examination of a chart having these oscillations thereon. Furthermore, the chart will have a record of the actual pressure throughout the period of use. Thus the accuracy of the compensated index 58 may be readily checked at any time since the uncompensated index 34 registers the volume irrespective of pressure, and the hand 79 records the pressure of the gas. Thus the volume of gas at a predetermined base pressure may be computed as in the prior methods of computation.

The proving dial indicia 7 on the gear 4 in cooperation with pointer 22 forms an important practical feature of this invention. In actual operation the counter 34 is so geared to the driving gear 4 that the counter index registers one unit for ten complete rotations of the gear 4. If, after the meter is connected in service, it is desired to check or prove the same, a definite quantity of gas is fed therethrough in the usual manner of proving gas meters. Assume now that the counter is so geared that the change of one figure thereon, for example from 3 to 4 in the unit column registers a flow of ten cubic feet. If now ten cubic feet is passed through the meter and the unit counter of index 34 does not move one complete unit but moves only a faction thereof, this fraction may be accurately ascertained from the indexes 7 on the miter gear 4. Thus the miter gear 4 may have made nine complete revolutions and seventy-six hundredths of a revolution, as clearly shown by the pointer 22. It will thus be obvious that the meter is registering only 97⁶⁄₁₀₀ cubic feet where it should have registered ten cubic feet. Therefore a proper adjustment may be simply made of driven portion 7 on gas meter 1a and other tests run until the miter gear 4 makes exactly ten revolutions and the zero returns to the pointer 22 for a passage of 10 cubic feet. The reverse operation of course takes place if the meter is running slightly too fast, since under this condition the miter gear 4 would make more than ten revolutions for ten cubic feet. The amount of excess is readily visible from the index 7 on the proving gear.

The present embodiment of this invention includes many adjustments whereby extreme accuracy of the instrument may be readily attained. However, many of these adjustments are adapted to be permanently made at the factory when the instrument is assembled and are not to be tampered with by the usual service men. The adjustable arm 74 which supports the Bourdon tube may be rotated about the supporting sleeve 68 by loosening the set screw 73 and moving the same bodily. By this adjustment, the recording hand 79 may be accurately positioned to cooperate with the chart to register correct pressure. Furthermore, the recording hand 79 is frictionally mounted on its strap 77 so that it may be turned with respect to the strap to give an accurate reading. However, both of the above adjustments are initial adjustments made at the factory and it should not be necessary to adjust them thereafter as a general rule. However, the adjustment of the Bourdon tube may be made to take care of fatigue of the parts such as fatigue of the Bourdon tube after long periods of use. This adjustment may be readily accomplished by subjecting the instrument to standard pressures and then adjusting the Bourdon tube about its support to accurately record the various pressures.

From an inspection of Figure 9, it will be seen that the operation of the cam by the pressure responsive element is by way of a linkage which in reality forms a quadrilateral. By loosening the set screw 85 and adjusting the screw 88 the cam may be accurately positioned for a given pressure applied to the pressure element. Then by loosening set screw 95, and adjusting the bracket 93 with respect to the link 96 and the strap 84, an adjustment may be obtained for the ratio of angular movement of the shaft 67 and the cam 107. It will be seen that this latter adjustment in reality changes the effective length of the link 96 with respect to strap 84 and changes the effective radius of strap 84. Furthermore it will be seen that the arm 97 which connects the strap 96 to the shaft 98 has two openings into either of which the strap may be connected. This adjustment is utilized for the purpose of substituting various cams to take care of various static pressure ranges. For example if the static pressure in the main varies from 0 to 50 pounds one type of cam will be used. However, if the static pressure varies from 50 to 100 pounds a different cam will be substituted, and correspondingly different cams for increasing static pressures.

It is well known that Boyle's law does not hold absolutely for commercial fuel gases, and as the pressure of such a gas increases, the volume reduction is in practice somewhat greater than the absolute pressure increases would indicate. At low and intermediate pressures this deviation is not considered important, and therefore cams 107 may be so cut as to allow the operative throw of lever 44 to increase at the same rate that the pressure increases. However at high ranges of pressures, it is felt by the gas industry that the deviations should be considered. Therefore, the formula $$V \times P = C$$

which is Boyle's law, must be modified according to observed deviations.

Therefore, for the higher pressures of gas at which the gas does not conform to Boyle's law the cams 107 should cause accurate registration of the volume as reduced to a predetermined base and should compensate for the deviation of the gas from Boyle's law. That is, for the pressures above 100 pounds absolute the cams 107 should allow the operative throw of lever 44 to increase at a greater rate than the pressure increases.

Each gas has an individual deviation from Boyle's law at high pressures and if exact registration is desired the particular gas of any consumer can be analyzed to determine its exact deviation from Boyle's law, and then the cams for this gas may be accurately cut to compensate for this deviation or in the adjustment of the instrument, and the various adjustments may be made with a standard cam, to correct according to the predetermined deviation. Sufficient accuracy may usually be obtained by cutting the cams or adjusting them to compensate for the deviations from Boyle's law of the average of the natural gases, however, without analyzing the individual gas.

Whether the cams 107 are cut to allow the throw of lever 44 to increase at the same rate that the pressure increases, or whether the cams are cut or adjusted to compensate for deviations from Boyle's law at higher pressures, the principle of operation of the mechanism remains the same. The cams 107 are of such contour that the registered volume is automatically reduced to a predetermined base pressure irrespective of variations in static pressure of the gas.

The cam 107 may also be adjusted angularly with relation to its shaft 98 by loosening the set screw which holds the cam in position. Furthermore the cam may be adjusted longitudinally of shaft 98. Since the cam 107 may be thus moved toward or from the pivotal axis of the actuating lever 44, obviously the operative throw of said lever is varied by this longitudinal movement of the cam. However, this longitudinal adjustment of the cam is adapted to be made at the factory and need not be changed later but is extremely desirable in attaining strict accuracy of the instrument when assembling.

In the actual calibration of the instrument, the adjustment provided by adjusting screw 39 is used in the initial setting of the instrument. If, for instance, a base pressure of four ounces is to be used and the atmospheric pressure at which the meter is located is 14.4#, the absolute base pressure is 14.4 plus .25=14.65#. Thus, if 14.65# absolute pressure is applied to the Bourdon tube 62 the cam 107 is moved to such position that the angular swing of arm 44 should be such that the compensated counter 58 should be operated at the same rate as the actual volume counter 34. The adjustment of the angular swing of arm 44 is very simply and easily made by loosening set screw 36 (Figure 5) and adjusting micrometer screw 39, set screw 36 being tightened to maintain this adjustment. It will be apparent that this adjustment changes the angle between arm 37 and the line through the pivot of arm 37 and the point of connection of link 25 and segment 26, and thus determines the bottom of the stroke of arm 37 and arm 44, which corresponds to the absolute zero pressure position of these arms. Since the weight of gas for a unit of volume is proportional to the absolute pressure, if we double the absolute pressure, 14.65, we should cause counter 58 to rotate twice as fast as counter 34. Thus, if the absolute pressure of two times 14.65, or 29.30# absolute, is applied to the Bourdon tube, cam 107 will have turned to a position so as to allow arm 44 to move an angular distance twice as great as that moved through with an absolute pressure of 14.65. If, on observation, counter 58 does not rotate at a speed just twice that of counter 34, adjusting screw 94 may be operated to properly vary the angular rotation of cam 107 with respect to the angular rotation of the Bourdon tube 62. It will be seen that with a properly shaped cam, and by using the adjustment as provided by micrometer screw 39, the micrometer screw 94, and occasionally by use of micrometer screw 88, the relative registering of the two counters can be adjusted so as to follow Boyle's law, which states that for a given volume the actual weight of gas varies directly as the absolute pressure.

The embodiment of the invention illustrated in Figure 15 includes the compensated and uncompensated dial indexes or counters but in place of the recording chart upon which is recorded the static pressure and the volumes of gas, an indicating hand 161 is mounted on the cam shaft 98. The hand 161 cooperates with a pressure scale 162 to merely indicate at all times the static pressure of the gas. It will be understood that the compensated index will give a complete and accurate indication of the volume of gas as reduced to a base pressure, and it is not absolutely essential that the pressures be recorded. The pressure indicating means shown in Figure 15 is desirable in many cases to indicate the instantaneous pressure of gas in the conduit where a recordation of said pressure is not necessary. The instrument illustrated in Figure 15 is therefore less expensive to build and has most of the desirable characteristics of the prior embodiment of this invention.

It will be obvious that many changes may be made in the embodiments illustrated without departing from the spirit of this invention. For example, the operating lever 44 is illustrated as operating the counter associated therewith during its downward movement and being released from the counter during its upward movement. Obviously this engagement could be reversed whereby the lever 44 moves the counter during its upward movement and is released therefrom during its downward movement.

Furthermore, although the illustrated embodiment of this invention shows cams 107 as cut from flat discs, it will be understood that other shapes of cam members may be used.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a meter for indicating the flow of gas corrected to a predetermined base pressure wherein said meter is adapted to be driven by the valve operating mechanism of a positive displacement meter, a counter and means including a gear provided with a proving index, said gear being adapted to drive said counter adapted to be operated by the volume measuring gas meter to indicate the volume of gas; a casing adapted for connection to the gas meter for housing said counter and driving means, said casing having an aperture opposite said gear provided with a pointer to cooperate with the index on said gear, whereby the accuracy of the volume measuring meter may be proved.

2. A pressure compensating gas meter comprising a gear adapted to be driven in response to flow of gas through the meter; a compensated volume indicator; means including pressure responsive means for driving said indicator in accordance with pressure variations to indicate thereon the volume of gas passing through the meter reduced to a predetermined base pressure; an uncompensated volume indicator, gearing between said driven gear and said uncompensated indicator whereby said indicator indicates the volume of gas passed; and said driven gear provided with indicia to serve as a proving index whereby said meter may be proved by passing a known volume of gas therethrough and noting the reading of the uncompensated indicator and proving index.

3. In a direct reading gas meter, an index; a means for driving said index by the flow of gas through the meter whereby said index will register the volume of gas reduced to a predetermined base pressure comprising a shaft driven by the flow of gas; a member reciprocated by said shaft; a pressure responsive element; a cam; means for positioning said cam by said pressure responsive element; a pivoted oscillatory arm; a one way clutch mechanism connecting said arm and said index; said oscillatory arm being oscillated in one direction by said member; biasing means for biasing said arm in the opposite direction; said cam being positioned in the path of said arm in a plane at right angles thereto to limit its movement in accordance with the pressure of the gas; means whereby said cam may be adjusted comprising a shaft, said cam being mounted on said shaft for adjustment axially of said shaft.

4. In a direct reading gas meter, an index; means for driving said index by the flow of gas through the meter whereby said index will register the volume of gas reduced to a predetermined base pressure, said means comprising a reciprocating member; means driven by the flow of the gas through the meter to reciprocate said member; a pivoted oscillatory arm oscillated in one direction by said reciprocating member; a one way clutch mechanism connecting said arm and said index; biasing means for biasing said arm in the opposite direction; a cam; mounting means for said cam comprising a shaft, said cam being adjustable axially and angularly of said shaft; pressure responsive means; means connecting said cam to said pressure responsive means, said cam being positioned in the path of said arm with its axis at an angle thereto to limit its movement in accordance with the pressure of the gas.

5. The invention as defined in claim 4 wherein the means connecting the cam to the said pressure responsive means comprises means to adjust the angular relation between said cam and said pressure responsive means.

6. In a direct reading gas meter, a shaft, a pressure responsive element connected thereto to rotate said shaft, a rotatable chart holder, a chart thereon, an arm carrying a recording pen secured to said shaft and adapted to record pressure variations on said chart, a second arm loosely swiveled on said shaft and carrying a segment pivoted to its outer end, a second segment on said shaft, means for adjusting said second segment angularly with relation to said second arm, a pivoted cam, a link connecting said cam with said first segment and pivoted thereto, and means for adjusting the angular relation of said first segment and second arm.

7. In a direct reading gas meter, a shaft, a pressure responsive element connected thereto to rotate said shaft, a rotatable chart holder, a chart thereon, an arm carrying a recording pen secured to said shaft and adapted to record pressure variations on said chart, a second arm loosely swiveled on said shaft and carrying a segment pivoted to its outer end, a second segment on said shaft, means for adjusting said second segment angularly with relation to said second arm, a pivoted cam, a link connecting said cam with said first segment and pivoted thereto, means for adjusting the angular relation of said first segment and second arm, a shaft adapted to be driven by the flow of gas, a pivoted oscillatory third arm driven by said shaft adapted to contact said cam whereby its movement in one direction is limited, a counter, and a one-way clutch mechanism connecting said third arm and counter.

8. In a direct reading gas meter, a shaft, a pressure responsive element connected thereto to oscillate said shaft, an arm loosely swiveled on said shaft and carrying a segment pivoted to its outer end, a second segment on said shaft, means for adjusting said second segment angularly with relation to said arm, a pivoted proportionally receding cam, a link connecting said cam with said first segment and pivoted thereto, means for adjusting the angular relation of said first segment and arm, a shaft adapted to be driven by the flow of gas, a pivoted oscillatory second arm driven by said shaft adapted to contact said cam whereby its movement in one direction is limited, a counter, and a one-way clutch mechanism connecting said second arm and counter.

ALLEN D. MacLEAN.